UNITED STATES PATENT OFFICE.

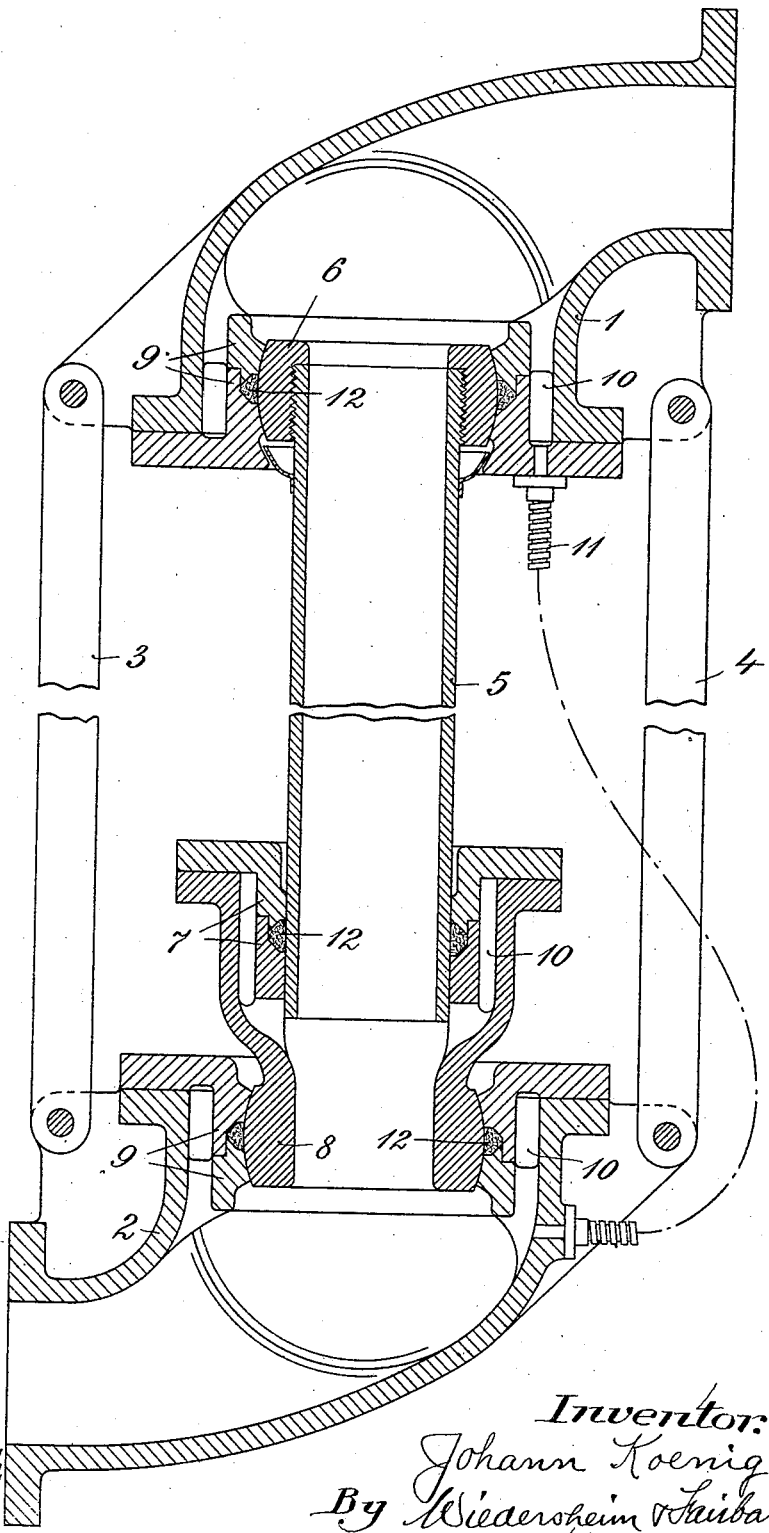

JOHANN KOENIG, OF RIGA, RUSSIA.

COMPENSATOR FOR PIPES.

935,996.  Specification of Letters Patent.  Patented Oct. 5, 1909.

Application filed February 24, 1908. Serial No. 417,297.

*To all whom it may concern:*

Be it known that I, JOHANN KOENIG, a subject of the King of Bavaria, residing at 97 Alexanderstrasse, Riga, Russia, have invented new and useful Improvements in Compensators for Pipes, of which the following is a specification.

For the purpose of compensating for alterations in length of piping a flexible pipe has been connected in the same and relieved of strain by bars jointed to the two connected pipe ends.

According to my invention the intermediate pipe employed to compensate for the alteration in length of the piping is a rigid pipe, connected with the piping by ball and socket joints and capable of expanding or sliding in the direction of its length in a stuffing-box or stuffing-boxes presented by the said ball and socket joints.

One form of construction of my invention is illustrated in the accompanying drawing, the figure being a vertical section through the compensator.

1 and 2 are the two flanged bends of the piping, connected with each other in well-known manner by bars 3, 4 jointed to them. The connecting-pipe 5 is furnished at one end with a ball-piece 6, and at the other end slides in longitudinal direction in a stuffing-box 7. The stuffing-box 7 is connected in any suitable manner to the flange of a second ball-piece 8, which enables the pipe 5 to turn in the bend 2.

In the particular constructive form of the invention illustrated in the drawing, the stuffing-boxes 9 constituting the sockets for the ball-pieces 6, 8, and the stuffing-box 7 to receive the end of the pipe 5, consist of a metallic collar and an annular gland, both exactly fitting the surface of the ball-pieces 6, 8 and the pipe 5 respectively. Between each collar and its gland a groove is presented, in which a packing-ring 12 of asbestos, soft metal or the like, not yielding below a certain pressure, is inserted. To enable this kind of joint to be employed, there is provided around each stuffing-box an annular space 10 into which the medium flowing through the piping, such as hot steam or cold water, can enter. Naturally, however, any suitable construction of stuffing-box may be employed, without departure from the essential features of the invention. Any water of condensation collecting in the space 10 at the top, can be run off by the provision of a suitable flexible pipe 11 of metallic hose, or the like.

Having thus described my invention, what I claim as new is:—

In a compensating device for piping, two flanged bends, means pivotally uniting the same, a connecting pipe having at one end a ball piece, a stuffing box carried by one of said bends and forming the socket for said ball piece, there being an annular space around the stuffing box, a stuffing box in the other bend, a ball piece therein with an annular space around the stuffing box, a stuffing box in the inner end of the last-mentioned stuffing box with an annular space therearound, the other end of said pipe being longitudinally received in the last-mentioned stuffing box, and means for drawing off the water of condensation collecting in the said annular spaces.

In witness whereof I have hereunto signed my name this 23/5th day of February 1908, in the presence of two subscribing witnesses.

JOHANN KOENIG.

Witnesses:
 EUGEN MARKOWSKY,
 LAURANCE HILL.